United States Patent Office 2,811,531
Patented Oct. 29, 1957

2,811,531
LIPOL AND PROCESS OF PREPARING THE SAME

Frederick W. Holly, Cranford, and Edward Walton, Scotch Plains, N. J., assignors to Merck & Co., Inc., Rahway, N. J., a corporation of New Jersey No Drawing. Application July 11, 1955,
Serial No. 521,385

5 Claims. (Cl. 260—327)

This invention is concerned generally with chemical compounds and with processes of preparing them. More particularly, it relates to the new chemical compound, lipol, and to the process of preparing this compound starting with lipoic acid, the source of which is disclosed in co-pending applications Serial No. 445,165, filed July 22, 1954, and Serial No. 580,476, filed April 25, 1956. Lipol is an effective growth-promoting agent for chicks, is of value in liver disease, and is useful in regulating fat metabolism. The lipol, subject of the present invention, may be chemically represented as follows:

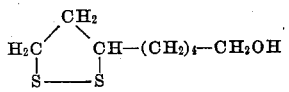

Lipol may be prepared by reacting an alkali metal lipoate (compound 1 hereinbelow) with oxalyl chloride thereby forming lipoyl chloride (compound 2), and reacting the latter compound with an alkali metal borohydride thereby forming lipol (compound 3). The reactions indicated hereinabove may be chemically represented as follows:

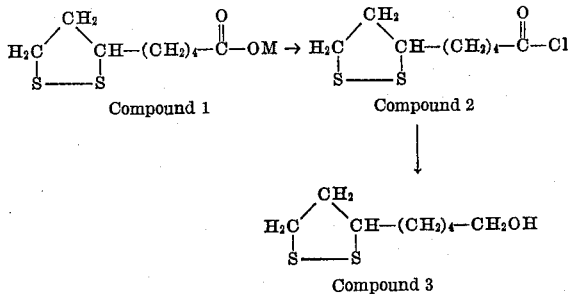

Compound 1    Compound 2

Compound 3

In the chemical formula identified as compound 1, M stands for alkali metal.

The reaction between the alkali metal salt of lipoic acid and oxalyl chloride is conveniently conducted by bringing the reactants together in an inert organic liquid, for example a hydrocarbon solvent such as benzene. As the alkali metal salt of lipoic acid we can utilize potassium lipoate, sodium lipoate, and the like. The reaction is ordinarily carried out at below room temperature, preferably at about 0° C., under which conditions the reaction is usually substantially complete in about two to three hours. The lipoyl chloride formed by the reaction is recovered from the reaction mixture by filtering to remove inorganic salts, and evaporating the hydrocarbon solvent from the filtered solution.

The lipoyl chloride is then dissolved in an anhydrous inert solvent, preferably a cyclic ether such as tetrahydrofuran, dioxane, and the like and the resulting solution treated with an alkali metal borohydride under substantially anhydrous conditions. As the alkali metal borohydride we ordinarily employ sodium borohydride. The reaction is ordinarily conducted at a temperature of about 20° C. or below under which conditions reaction is usually substantially complete in about two hours. The reaction mixture is cooled and diluted slowly with approximately an equal volume of water, the solution is acidified to a pH 3 with mineral acid solution, and the aqueous acidic solution is extracted with a water-immiscible organic solvent such as chloroform. The chloroform extract may be evaporated if desired to produce dihydrolipol (6,8-dithiol-octanol). It is ordinarily preferred, however, to oxidize the dihydrolipol directly in the chloroform solution, without isolation, utilizing iodine as the oxidizing agent. This is accomplished by adding a 10% iodine-potassium iodide solution to the chloroform solution containing the dihydrolipol until the iodine color is permanent; the excess iodine is reduced with a mild reducing agent such as aqueous sodium bisulfite, the chloroform solution is washed with an aqueous bicarbonate solution, then with water and dried. The dried chloroform solution is evaporated to dryness to give lipol which may be further purified, if desired, by chromatography over acid-washed alumina.

The following example illustrates a method of carrying out the present invention, but it is to be understood that this example is given for purposes of illustration and not of limitation.

Example 1

Oxalyl chloride (10 ml.), dissolved in 40 ml. of anhydrous benzene, was cooled in an ice bath, while 3.2 g. of sodium lipoate was added in small portions in a 45-minute period. The reaction mixture was stirred for an additional 2.5 hours.

The reaction mixture was filtered and concentrated in vacuo. The residue was redissolved in 20 ml. of benzene and concentrated in vacuo. Yield 2.7 g. of lipoyl chloride.

A solution of 1.35 g. of lipoyl chloride in 25 ml. of anhydrous dioxane was stirred and cooled in an ice-bath. Three grams of sodium borohydride was added and the mixture was stirred for two hours at room temperature. The mixture was cooled and diluted slowly with an equal volume of water. The solution was acidified to pH 3 with concentrated hydrochloric acid and the product was isolated by chloroform extraction. The product was oxidized by adding 10% iodine-potassium iodide solution to the chloroform solution until the iodine color was permanent. The excess iodine was reduced with dilute aqueous sodium bisulfite and the chloroform solution was washed with dilute aqueous sodium bicarbonate and finally with water. The chloroform solution was dried over anhydrous magnesium sulfate and concentrated in vacuo to yield 410 mg. of lipol which was obtained as an oil.

This product was purified by treating 350 mg. of the residual oil with 20 ml. of benzene. The benzene solution was decanted from the small amount of insoluble oil and was chromatographed on 50 g. of acid-washed alumina. Benzene elution was continued until the eluate was free of dissolved material. The product was then eluted with ethyl acetate to yield 137 mg. of oil. This oil was dissolved in 20 ml. of chloroform and the chloroform solution was filtered from a small amount of white insoluble material, and the filtered chloroform solution was evaporated in vacuo to give substantially pure lipol;

$$\lambda_{max}^{CH_3OH} 332m\mu (\epsilon 165), \lambda_{max}^{oil\ film} 3.02\mu$$

Various changes and modifications may be made in carrying out the present invention without departing from the spirit and scope thereof. Insofar as these changes and modifications are within the purview of the annexed claims, they are to be considered as part of our invention.

We claim:
1. Lipol, having the structural formula:

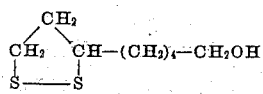

2. The process which comprises reacting lipoyl chloride with an alkali metal borohydride followed by a mild oxidizing agent to form lipol, having the structural formula:

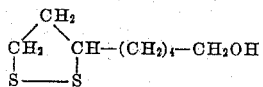

3. The process which comprises reacting lipoyl chloride with sodium borohydride in dioxane under substantially anhydrous conditions, and then reacting the reduction product, thus obtained, with iodine to form lipol, having the structural formula:

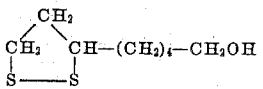

4. The process which comprises reacting 6,8-dithiol-octanol with a mild oxidizing agent to form lipol, having the structural formula:

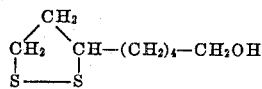

5. The process which comprises reacting 6,8-dithiol-octanol with iodine to produce lipol, having the structural formula:

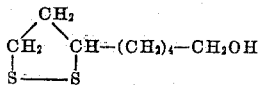

No references cited.